J. F. ROWLEY.
KNEE JOINT FOR ARTIFICIAL LIMBS.
APPLICATION FILED MAR. 5, 1919.
1,321,151.
Patented Nov. 11, 1919.
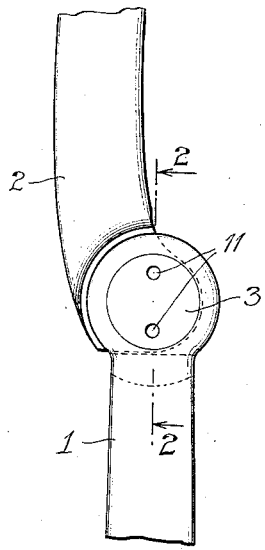
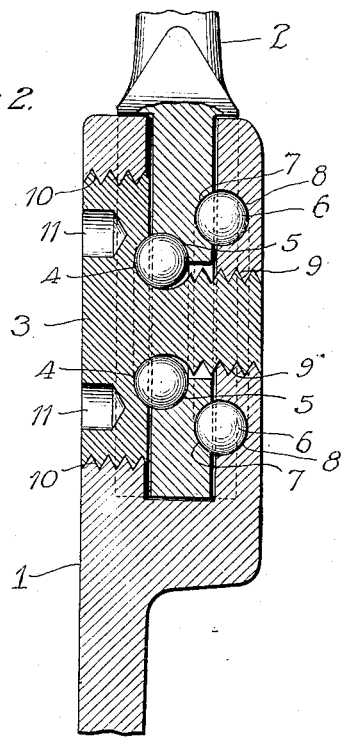
WITNESSES:
Martin H. Olsen.
W. E. Anderson.
INVENTOR.
James F. Rowley
BY Rummler & Rummler,
ATTORNEYS.

UNITED STATES PATENT OFFICE.

JAMES F. ROWLEY, OF CHICAGO, ILLINOIS.

KNEE-JOINT FOR ARTIFICIAL LIMBS.

1,321,151.  Specification of Letters Patent.  Patented Nov. 11, 1919.

Application filed March 5, 1919. Serial No. 280,773.

*To all whom it may concern:*

Be it known that I, JAMES F. ROWLEY, a citizen of the United States of America, and a resident of Chicago, county of Cook, and State of Illinois, have invented certain new and useful Improvements in Knee-Joints for Artificial Limbs, of which the following is a specification.

The main objects of this invention are to provide an improved form of ball bearing joint for artificial limbs having an improved arrangement of the ball races whereby liability of the hinge pin to work loose is practically eliminated and thereby rendering unnecessary the provision of means for locking the pin in different positions of adjustment.

An illustrative embodiment of this invention is shown in the accompanying drawings, in which—

Figure 1 is a fragmentary side elevation of the bearing as employed in the knee joint for an artificial limb.

Fig. 2 is a section of the same taken on the line 2—2 of Fig. 1.

Ball bearings are utilized in the knee joints of artificial limbs not merely for the usual purpose of reducing friction, but to produce a joint wherein the lack of lubrication will not interfere with the desired action or produce sound. It is important, especially where amputation is below the knee, that the joint be of minimum thickness in the axial direction, that it be capable of adjustment for the purpose of permanently regulating the pressure at the bearings to maintain the desired action. It is also desirable, especially on account of the fact that the bearing is likely to be unlubricated, that there be no tendency of the hinge pin to work loose either through friction or through unbalanced strains due to sidewise pressure arising in the act of walking.

The improved arrangement of the ball races, as shown in the drawings, effectively accomplishes this result. The forked member 1 is embedded into the side of the leg section of the limb so that its outer face, which is at the left of Fig. 2 and at the front in Fig. 1, is substantially flush with the outer face of the leg. The upper member 2 is secured to the band or corset, which is secured to the thigh of the wearer. The ball race 4, which is undercut both into the head and shank of the hinge pin 3, coacts with a series of balls and a race 5 located at and extending around the edge of the pin aperture in the unforked member 2. The ball race 4 is undercut into the shank of the pin 3 beyond the root line of the threads 9, *i. e.*, inward of an imaginary surface passing through the base of the threads and which determines the depth to which the threads are cut. The second series of balls 6 coact with ball races 7 and 8 on the other side of the member 2, and the other fork of the member 1, these races being of greater diameter than the races 4 and 5 and accommodating a larger number of balls.

The peripheries of the shank and head of the hinge pin are threaded to fit the threads in the adjacent parts of the member 1, and said threads are of the same pitch. The hinge pin is provided with the usual spanner holes 11.

On account of the undercutting of the hinge pin by the ball race 4 and the placing of the race 5 at the edge of the pin aperture, the pin 3 serves to center the hinge members with respect to each other and at the same time prevents any tendency of the pin to tilt and thereby work loose under side strains, and the ball races 7 and 8, being of larger diameter, permit the axial spacing of the two sets of balls to be reduced to a minimum and at the same time provide added stability to the joints against the tilting action heretofore referred to. With this form of joint, there is no tendency of the pin to work loose.

Although but one specific embodiment of this invention has been herein shown and described, it will be understood that numerous details of the construction may be altered or omitted without departing from the spirit of this invention as defined by the following claims.

I claim:

1. A hinge joint for artificial limbs, comprising a pair of members which are formed to interfit at one end, one being forked to straddle the other, a hinge pin connecting said members and having a threaded shank with an enlarged head at one end thereof, and a ball bearing comprising a series of balls interposed between said unforked member and the shank of said pin, said pin having a ball race formed therein adjacent to the head and extending into the shank.

2. A hinge joint for artificial limbs, comprising a pair of members which are formed to interfit at one end, one being forked to straddle the other, a hinge pin connecting said members and having a threaded shank with an enlarged head at one end thereof, and a ball bearing comprising a series of balls interposed between said unforked member and said pin, said pin having a ball race formed therein adjacent to the head and extending into the shank beyond the root line of the threads thereof.

3. A hinge joint for artificial limbs, comprising a pair of members which are formed to interfit at one end, one being forked to straddle the other, a hinge pin connecting said members and having a threaded shank with an enlarged head at one end thereof, and a ball bearing comprising a series of balls interposed between said unforked member and said pin, said pin having a ball race formed therein adjacent to the head and extending into the shank beyond the root line of the threads thereof, said unforked member being apertured to receive said pin and having a ball race at the edge of said aperture coacting with the head of said pin.

4. A hinge joint for artificial limbs, comprising a pair of members which are formed to interfit at one end, one being forked to straddle the other, a hinge pin connecting said members and having a threaded shank with an enlarged head at one end thereof, a ball bearing comprising a series of balls interposed between said unforked member and said pin, said pin having a ball race formed therein adjacent to the head and extending into the shank beyond the root line of the threads thereof, said unforked member being apertured to receive said pin and having a ball race at the edge of said aperture coacting with the head of said pin, and a second ball bearing at the opposite side of said unforked member and of greater diameter than said first ball bearing.

Signed at Chicago this 3rd day of March, 1919.

JAMES F. ROWLEY.